2,968,975
COMBINED DRILL SUPPORT AND CHIP CUTTER DEVICE

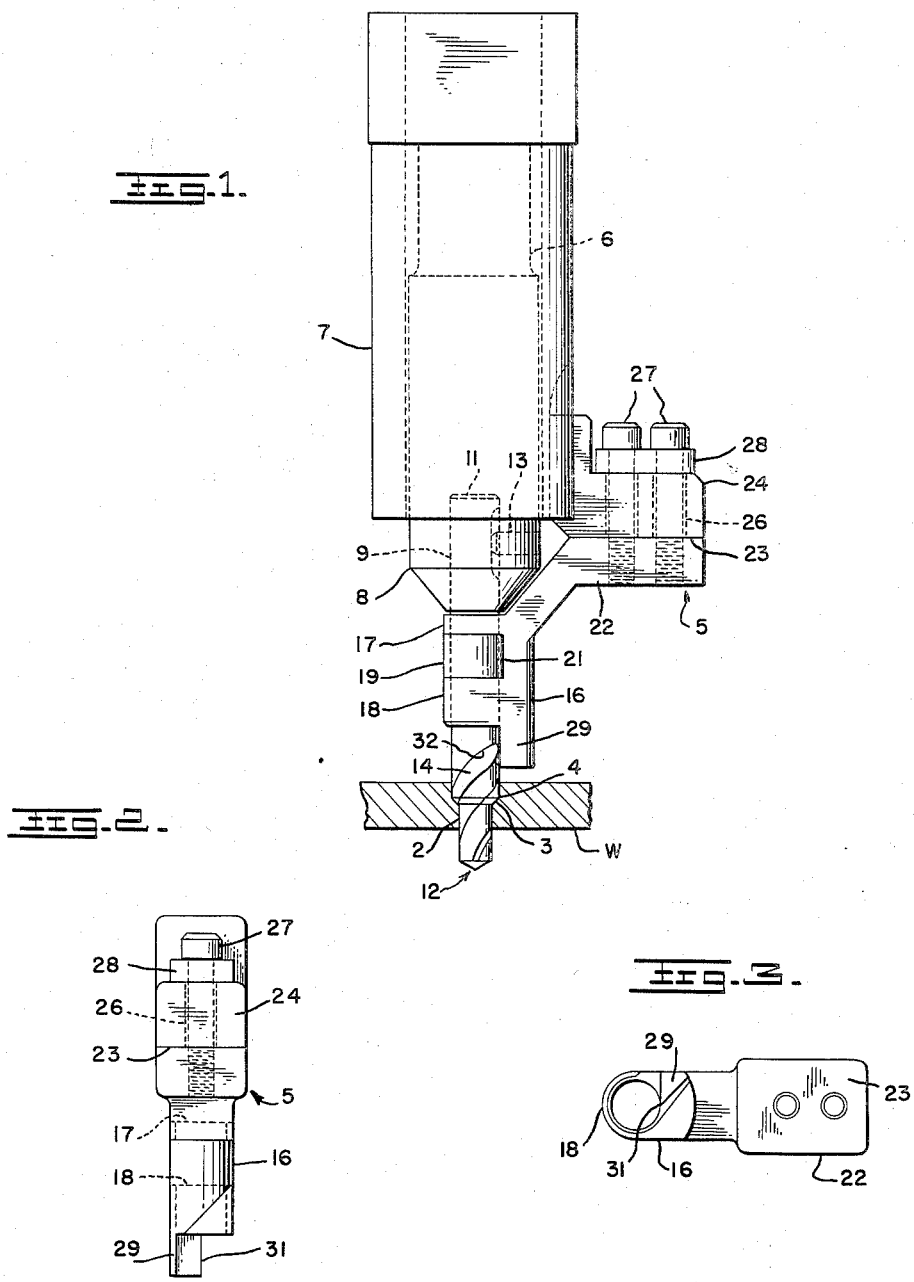

Edward H. Niemeyer, Mount Rainier, Md., assignor to ACF Industries, Incorporated, New York, N.Y., a corporation of New Jersey Filed July 28, 1958, Ser. No. 751,364

7 Claims. (Cl. 77—55)

This invention relates to machines for drilling, countersinking and/or counterboring holes and, more particularly, to a drilling machine provided with a combined drill support and chip cutter device.

In the high speed drilling and countersinking and/or counterboring of rivet holes in relatively thick alclad aluminum alloy sheets for use in the fabrication of aircraft wings, truck bodies, etc., the holes are not always of uniform size and shape due to chattering of the drilling tool. During the drilling operation, long metallic chips tend to curl around the drilling tool and scratch the relatively soft thin aluminum coating on the sheets.

It is, therefore, an object of the invention to provide a combined drill support and chip cutter device adapted to prevent chattering of the drill and also to cut chips into relatively small pieces to prevent marring of the finish on the workpieces.

Another object of the invention resides in the provision of a combined drill support and chip cutter device having a bearing to receive a drill, and a sharp cutting edge below the bearing to slidably engage the side of the drill to sever chips passing upwardly along the flutes of the drill.

A further object of the invention resides in the provision of a combined drill support and chip cutter device adapted to be adjustably positioned upon a drill spindle bearing sleeve for common reciprocable movement with the sleeve and drill.

Another object of the invention resides in the provision of means for supplying lubricant to the support bearing surface during rotation of the drill therein.

Another object is to provide a combined drill support and chip cutter device which is relatively simple and inexpensive in construction and reliable in operation.

The invention embodies other novel features, details of construction and arrangement of parts which are hereinafter set forth in the specification and claims and illustrated in the accompanying drawings, forming part thereof, wherein:

Fig. 1 is a fragmentary front elevation illustrating a portion of a drill press provided with a combined drill support and chip cutter device embodying features of the invention.

Fig. 2 is a side elevation of same.

Fig. 3 is a bottom plan view of same.

Referring now to the drawings for a better understanding of the invention, a combined drill support and chip cutter device, indicated generally at 5, is shown as applied to a conventional drill press comprising a spindle 6 mounted for rotational movement and non-axial movement in a spindle support member 7. A suitable chuck 8 is secured on the end of the spindle and provided with an axial opening 9 to snugly receive the shank portion 11 of a drilling tool 12 which is detachably secured in the chuck by a set screw 13. During drilling of holes in workpieces W, the support member 7 is reciprocated by suitable manual or power actuating means to move the drilling tool 12 into and out of engagement with the workpieces. The drilling tool 12 is shown as comprising a stepped twist drill having helical flutes 14 to receive chips cut from the workpieces during the drilling of holes to receive countersink head rivets.

The combined drill support and chip cutting device 5 is shown as comprising a body 16 formed with spaced bearings 17 and 18 to receive the drill shank 11 for snug rotational movement therein. To supply the bearings with lubricant, a sleeve 19 of suitable porous material impregnated with oil is mounted on the drill shank 11 between the bearings and engaged against rotational movement relative to the body 16 which engages a flat surface 21 on the sleeve.

The body 16 is provided with an integral support arm 22 having a flat surface 23 disposed in a plane normal to the axis of the openings in the bearings 17 and 18. A bracket 24 is brazed, welded, or otherwise secured in fixed position on the spindle support member 7 and formed with a flat surface for complementary abutting engagement with the flat surface 23 on the support arm. The bracket 24 is formed with openings 26 to loosely receive screws 27 which are threaded into the support arm 22. A clamping plate 28 formed with openings to snugly receive the screws 27 is engaged between the screw heads and the bracket 24.

A chip cutter 29 is provided on the body 16 below the bearing 18 and formed with a sharp edge 31 which extends parallel to the axis of the drill openings in the bearings 17 and 18 for line contact sliding engagement along the side of the drill.

As illustrated in Fig. 1, the stepped drill 12 is rotated at, for example, 4000 r.p.m. to form coaxial bores 2 and 3 merging with an annular tapered shoulder 4. To prevent vibration, chattering, and enlargement of the rivet holes, the drill is journaled intermediate its ends in the bearings 17 and 18 provided in the body 16 which, in turn, is rigidly secured to the spindle support member 7.

By providing holes 26 in the bracket 24 to loosely receive the cap screws 27, it will be noted that the device 5 is self-aligning when the drill is engaged in the bearings 17 and 18 and before the screws are tightened, and that tightening of the screws does not move the device out of alignment with the drill.

During the drilling operation, long chips are cut from the workpiece W and pass upwardly through the flutes 14 for engagement between the chip cutter edge 31 and the inclined trailing edges 32 of the flutes, whereby the chips are sheared into short sections. In the drilling of thick alclad aluminum alloy sheets without the use of a chip cutter, the metal cut from the sheets would be in the form of long helical chips which would wind around the drill and scratch the aluminum clad surface of the sheets.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. A combined drill support and chip cutting device for use on a drilling machine having a spindle support member including a drill spindle journaled for rotational and non-axial movements in the spindle support member, a body having an arm for detachable engagement on a spindle support member, a bearing provided on said body to rotatably engage the medial portion of a fluted drill mounted in the drill spindle and having an axis aligned with the said drill spindle, and a chip cutter on said body having a straight cutting edge offset from and extending parallel to the axis of said bearing for line contact engagement with the drill, whereby said cutting edge co-acts with edges of the flutes in the drill to sever helical chips into small sections during a drilling operation, said arm having a flat surface normal to the axis of said bearing for flush abutting engagement against a complementary surface on the spindle support member.

2. A combined drill support and chip cutting device for use on a drilling machine having a spindle support member including a drill spindle journaled for rotational and non-axial movements in the spindle support member, a body having an arm for detachable engagement on a spindle support member, spaced bearings provided on said body to rotatably engage the medial portion of a fluted drill mounted in the drill spindle and having an axis aligned with the said drill spindle, and a chip cutter on said body having a straight cutting edge offset from and extending parallel to the axis of said bearing for line contact engagement wtih the drill, whereby said cutting edge coacts with edges of the flutes in the drill to sever helical chips into small sections during a drilling operation, and an oil impregnated bushing between said bearings to receive the drill and to lubricate the bearings.

3. In a drilling machine, a spindle support member, a drill spindle journaled for rotational and non-axial movements in said support member, means to mount a fluted drill on said spindle, a combined drill support and chip cutting device comprising a body having an arm integral therewith and projecting therefrom, a bracket mounted on said support member and rigidly secured to said arm, a bearing fixed on said body to rotatably engage the drill intermediate its ends, and a chip cutter integral with said body having a straight cutting edge offset from and extending parallel to the axis of said bearing for line contact engagement with the side of the drill, whereby said cutting edge coacts with edges of the flutes in the drill to sever helical chips into small sections during a drilling operation.

4. In a drilling machine, a spindle support member, a drill spindle journaled for rotational and non-axial movements in said support member, means to mount a fluted drill on said spindle, a combined drill support and chip cutting device comprising a body having an arm propjecting therefrom, a bracket mounted on said support member and secured to said arm, a bearing on said body to rotatably engage the drill intermediate its ends, and a chip cutter on said body having a straight cutting edge offset from and extending parallel to the axis of said bearing for line contact engagement with the side of the drill, whereby said cutting edge coacts with edges of the flutes in the drill to sever helical chips into small sections during a drilling operation, and means for adjusting the position of said arm on said bracket along a plane normal to the axis of rotation of the drill.

5. In a drilling machine, a spindle support member, a drill spindle journaled for rotational and non-axial movements in said support member, means to mount a fluted drill on said spindle, a combined drill support and chip cutting device comprising a body having an arm projecting therefrom, a bracket mounted on said support member and secured to said arm, spaced bearings on said body to rotatably engage the drill intermediate its ends, and a chip cutter on said body having a straight cutting edge offset from and extending parallel to the axis of said bearing for line contact engagement with the side of the drill, whereby said cutting edge coacts with edges of the flutes in the drill to sever helical chips into small sections during a drilling operation.

6. In a drilling machine, a spindle support member, a drill spindle journaled for rotational and non-axial movements in said support member, means to mount a fluted drill on said spindle, a combined drill support and chip cutting device comprising a body having an arm projecting therefrom, a bracket mounted on said support member and secured to said arm, spaced bearings on said body to rotatably engage the drill intermediate its ends, and a chip cutter on said body having a straight cutting edge offset from and extending parallel to the axis of said bearing for line contact engagement with the side of the drill, whereby said cutting edge coacts with edges of the flutes in the drill to sever helical chips into small sections during a drilling operation, and an oil impregnated sleeve interposed between said bearings to receive the drill and to lubricate the bearings.

7. A combined drill support and chip cutting device comprising a body having an arm integral therewith, spaced bearings provided on said body to rotatably engage the medial portion of a fluted drill when mounted for rotation within the said bearing, and a chip cutter integral with said body and having a straight cutting edge offset for engagement with the drill flutes whereby said cutting edge coacts with edges of the flutes in the drill to sever helical chips into small sections during a drilling operation, and an oil impregnated bushing between said bearings to receive the drill and to lubricate the bearings.

References Cited in the file of this patent

UNITED STATES PATENTS

| | | |
|---|---|---|
| 2,375,367 | Johnson | May 8, 1945 |
| 2,669,889 | Huller | Feb. 23, 1954 |
| 2,670,637 | Whitechester | Mar. 2, 1954 |
| 2,847,880 | Neidig | Aug. 19, 1958 |